United States Patent
Schlumpf

(10) Patent No.: US 8,534,161 B2
(45) Date of Patent: Sep. 17, 2013

(54) SHIFTABLE BOTTOM BRACKET GEAR TRAIN

(75) Inventor: Florian Schlumpf, Vilters (CH)

(73) Assignee: Schlumpf Innovations GmbH, Vilters (CH)

( * ) Notice: Subject to any disclaimer, the term of this patent is extended or adjusted under 35 U.S.C. 154(b) by 163 days.

(21) Appl. No.: 13/264,113

(22) PCT Filed: Apr. 7, 2010

(86) PCT No.: PCT/IB2010/051495
§ 371 (c)(1),
(2), (4) Date: Oct. 12, 2011

(87) PCT Pub. No.: WO2010/119372
PCT Pub. Date: Oct. 21, 2010

(65) Prior Publication Data
US 2012/0036954 A1    Feb. 16, 2012

(30) Foreign Application Priority Data
Apr. 15, 2009   (CH) ........................................ 0597/09

(51) Int. Cl.
*F16H 48/12*    (2012.01)
*F16H 35/06*    (2006.01)

(52) U.S. Cl.
USPC ................................. 74/650; 74/391; 74/396

(58) Field of Classification Search
USPC .................................... 74/650, 391, 396, 460
See application file for complete search history.

(56) References Cited

U.S. PATENT DOCUMENTS

| 516,933 | A | * | 3/1894 | Jacoby | 280/236 |
|---|---|---|---|---|---|
| 3,944,253 | A | * | 3/1976 | Ripley, III | 280/238 |
| 5,303,942 | A | | 4/1994 | Schlumpf | |
| 5,609,071 | A | * | 3/1997 | Schlumpf | 74/594.2 |
| 6,312,355 | B1 | * | 11/2001 | Nishimoto | 475/289 |
| 7,712,566 | B2 | * | 5/2010 | Jordan et al. | 180/260 |
| 8,033,945 | B2 | * | 10/2011 | Patterson | 475/259 |

FOREIGN PATENT DOCUMENTS

| DE | 198 18 870 A1 | 11/1999 |
|---|---|---|
| DE | 102008045294 | 3/2010 |
| EP | 0 562 470 A1 | 9/1993 |
| EP | 1 980 483 A1 | 10/2008 |

* cited by examiner

*Primary Examiner* — Ha D Ho
(74) *Attorney, Agent, or Firm* — Henry M. Feiereisen LLC

(57) ABSTRACT

The shiftable bottom bracket gear train according to the invention for a bicycle or the like comprises a bottom bracket tube, a gear train housing having an associated sprocket and a disk arranged parallel thereto, and a drive shaft, which penetrates the bottom bracket tube in the axial direction and is operatively connected to pedal cranks and in which a shifting axle is arranged, which is connected to a coupling piece and can be actuated from the outside by means of a shifting element. In the shiftable bottom bracket gear train, the torque support of the gear train engages on the bottom bracket tube (1) or on an adapter (2) inserted in the bottom bracket tube (1), and is implemented by using screws (8) or screw connections (4,5,12), pins (9, 17), cams (14), or clamps (13).

8 Claims, 5 Drawing Sheets

US 8,534,161 B2

SHIFTABLE BOTTOM BRACKET GEAR TRAIN

CROSS-REFERENCES TO RELATED APPLICATIONS

This application is the U.S. National Stage of International Application No. PCT/IB2010/051495, filed Apr. 7, 2010, which designated the United States and has been published as International Publication No. WO 2010/119372 and which claims the priority of Swiss Patent Application, Serial No. 00597/09, filed Apr. 15, 2009, pursuant to 35 U.S.C. 119(a)-(d).

BACKGROUND OF THE INVENTION

The present invention relates to a shiftable bottom bracket gear train for a bicycle and the like, including a bottom bracket tube, a gear train housing with associated sprocket and a disk arranged in parallel as well as a drive shaft extending through the bottom bracket tube in an axial direction and a drive shaft operatively connected with pedal cranks, in which a shift axle is arranged which is connected with a coupling piece and can be controlled from the outside with a shifting member.

A shiftable bottom bracket gear train of the aforedescribed type which operates according to the principle of a planetary gear is disclosed in the published patent application EP 0 562 470 A1. Characteristic for such gear trains is that they have only a single input and a single output which are coaxially arranged. Because these gear trains also change the output torque, a part of the gear train must be retained as torque support. In the conventional bottom bracket, the torque support is provided by a torque lock which includes a lever arm that is attached on the rear wall of the gear train housing or is integrated in the housing, wherein the lever arm is fixedly connected with the rear-wheel fork. With this torque lock, a torque is supported which acts essentially on the rear wall of the gear train housing. With this arrangement, the frame must disadvantageously have a certain shape to enable attachment of the torque lock on the rear-wheel fork.

SUMMARY OF THE INVENTION

It is the object of the present invention to form a bottom bracket gear train of the aforedescribed type so that most of the aforementioned disadvantages are eliminated and the bottom bracket gear train can be inserted in the bottom bracket tube of a bicycle independent of the form of the frame structure.

The object is attained by a bottom bracket gear train for a bicycle, with a bottom bracket tube having an interior thread, a gear train housing having a sprocket and a disk arranged in parallel with the sprocket, a drive shaft extending through the bottom bracket tube in an axial direction and operatively connected with pedal cranks, a shifting axle arranged in the drive shaft, wherein the shifting axle is connected to a coupling piece and configured for external actuation by a shifting element, and a gear wheel having a flanged portion with an exterior thread. A torque lock arranged between the gear wheel and the bottom bracket tube is constructed with a screw connection between the exterior thread of the flanged portion of the gear wheel and the interior thread of the bottom bracket tube so as to block the gear wheel from rotating relative to the bottom bracket tube. Additional features and advantages of the present invention will be described in the following description of preferred exemplary embodiments with reference to the appended drawings.

BRIEF DESCRIPTION OF THE DRAWING

It is shown in

DETAILED DESCRIPTION OF PREFERRED EMBODIMENTS

The Figures and schematic diagrams show only those elements of the shiftable bottom bracket gear train that are relevant for the invention, while omitting details such as threads and the like. Identical reference symbols are used for identical elements, and the first descriptions relate to all the Figures, unless otherwise explicitly mentioned.

Bottom bracket gear trains are designed for installation directly in the bottom bracket tube which is integrated in the bicycle frame, or for the installation in an adapter arranged in the bottom bracket tube and fixedly connected with the bottom bracket tube. The adapter constructed as an eccentric member operates as a chain tensioner. The adapter may also have a centric bore for receiving a bottom bracket gear train or may be constructed as a tube segment in order to, for example, compensate for different diameters of bottom bracket tube and bottom bracket gear train. According to the principle of the shiftable bottom bracket gear train according to the invention, the torque support of the gear train operates on the bottom bracket tube or on the adapter in the bottom bracket tube. This means that no additional installation elements of the bottom bracket gear train need to be connected with the rear-wheel fork of a bicycle. Depending on the construction of the gear train, the torque lock is formed by a fixed connection of the gear wheel to be blocked in the bottom bracket gear train—the sun wheel or the hollow wheel—with the bottom bracket tube or with the adapter in the bottom bracket tube. This torque lock is fixedly connected, i.e. the gear wheel of the bottom bracket gear train is blocked, for example with screws or screw connections, pins, cams or by clamping. In each of the illustrated exemplary embodiments, the torque of the sun wheel is blocked. It will be understood that the torque lock via the bottom bracket tube or the adapter can also be used for the other gear train designs.

Figure 1A:
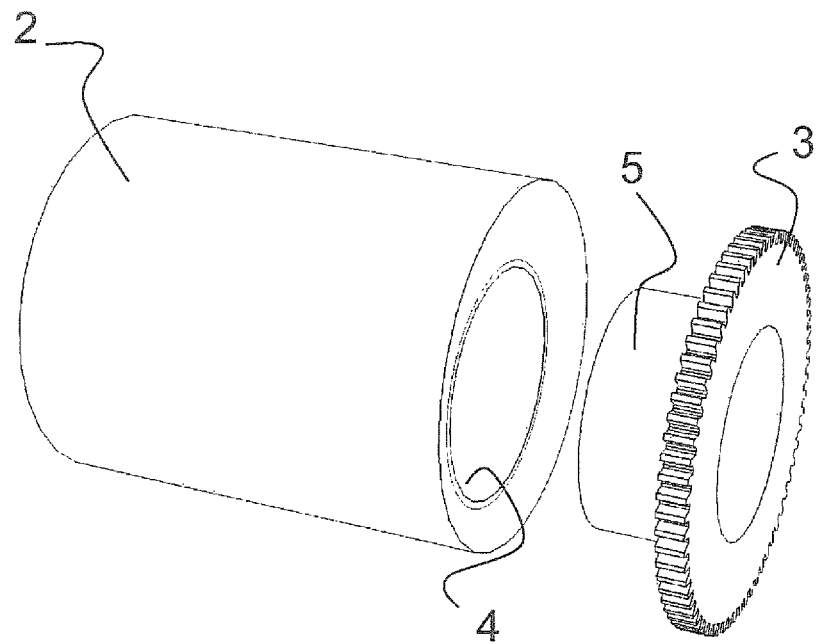
FIG. 1A a schematic diagram of the parts of the bottom bracket gear train for torque-locking a sun wheel which can be screwed with a flanged-on thread into an eccentric member of the bottom bracket tube.

FIG. 1A shows in a schematic diagram a cylindrical adapter 2 constructed as an eccentric member of an unillustrated bottom bracket tube. The adapter 2 has a through-hole extending parallel to and eccentric to the cylinder axis of the adapter 2 with a thread 4, wherein the through hole is configured to receive a bottom bracket. The toothed wheel 3 functioning as the sun wheel of the bottom bracket gear train has a flanged-on exterior thread 5, with which the sun wheel 3 can be fixedly screwed together with the thread 4 of the through-bore in the eccentric member 2. In a different embodiment without an adapter, the exterior thread 5 of the sun wheel 3 can be directly screwed into a corresponding interior thread in the bottom bracket tube. By selecting a left-handed thread for reduction gears and a right-handed thread for step-up gears, the reaction torques are securely absorbed. This embodiment of the bottom bracket gear train can advantageously be easily installed. During installation of the gear train, the housing cover 6 is clamped between the sun wheel 3 and the bottom bracket tube. However, the cover 6 is not connected with the sun wheel or held by the sun wheel before installation. To facilitate installation of the gear train and centering of the cover 6 with respect to the gear axis, the cover 6 is advantageously attached on the sun wheel 3. Because there is very little space available for mechanical support means, one possibility is to glue the cover 6 to the sun wheel.

Figure 1B:
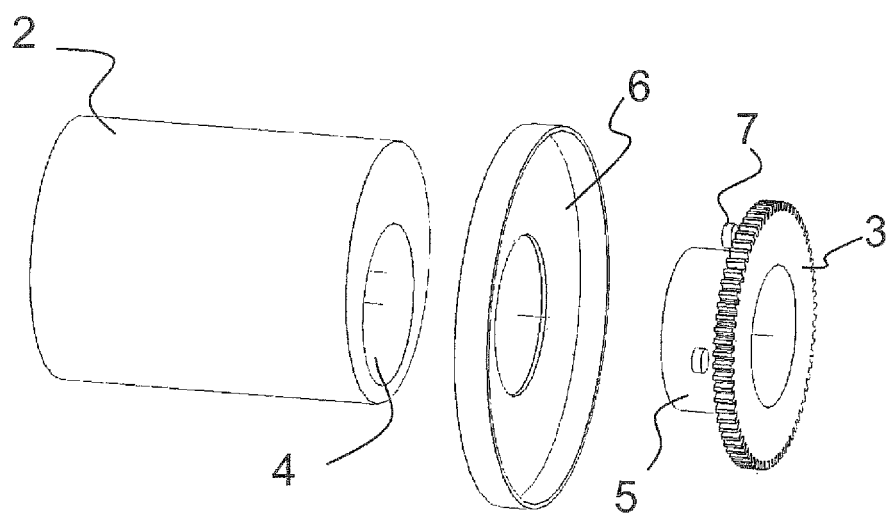
FIG. 1B the schematic diagram of the parts of the bottom bracket gear train for torque-locking a sun wheel as in FIG. 1A with a gear housing cover and with magnets for holding the cover.
Figure 1C:
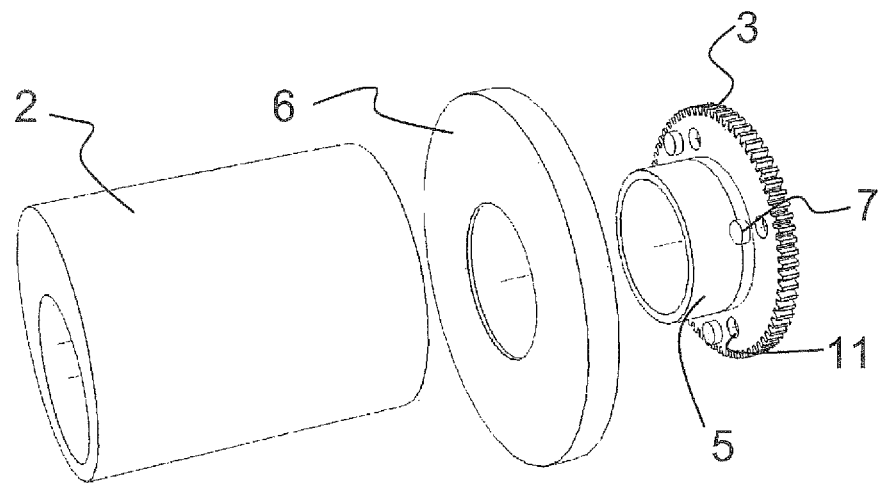
FIG. 1C the schematic diagram of the parts of the bottom bracket gear train for torque-locking a sun wheel as in FIG. 1B, as seen from the frame side.

FIGS. 1B and 1C show another possibility for holdings the cover 6 on the sun wheel 3. The side of the sun wheel 3 facing the cover 6 includes blind holes 11 in which a suitable small magnet 7 is inserted or glued. The cover 6 can be centered on the sun wheel 3 before installation of the bottom bracket gear train and secured in place until the final installation. Sealing elements arranged between the cover and the sun wheel 3 are held in this way and are prevented from shifting during the installation of the gear train; in particular, no lubricant can leak out.

Figure 2:
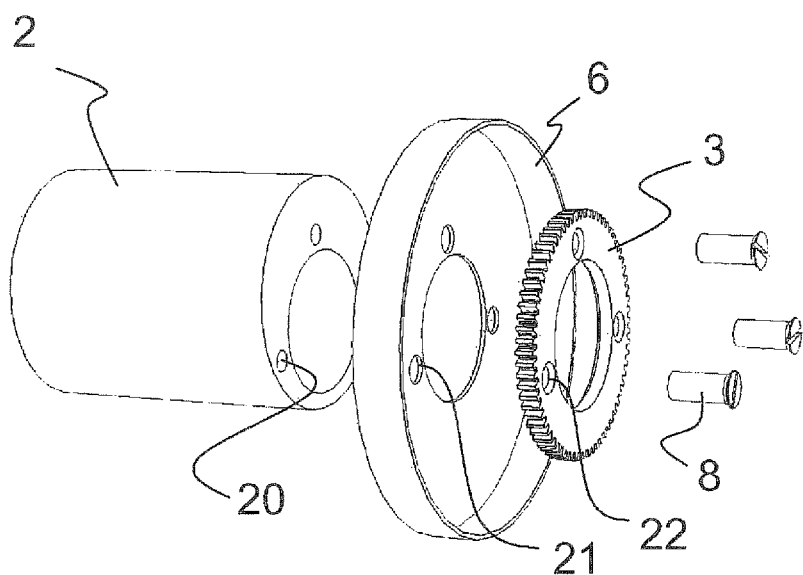
FIG. 2 the schematic diagram of the parts of the bottom bracket gear train for torque-locking a sun wheel, which is attached with a screw connection on the eccentric member of the bottom bracket tube.

FIG. 2 shows a variant of the torque lock of the sun wheel 3 of a bottom bracket gear train, wherein the sun wheel 3 is screwed together with the bottom bracket tube or the eccentric member 3 by way of screws 8. For this purpose, the sun wheel 3 and the cover 6 have corresponding through-bores 22, 21 through which the screws 8 can be screwed into the threaded holes 20 in the adapter or eccentric member 2 during installation of the bottom bracket gear train.

Figure 3:
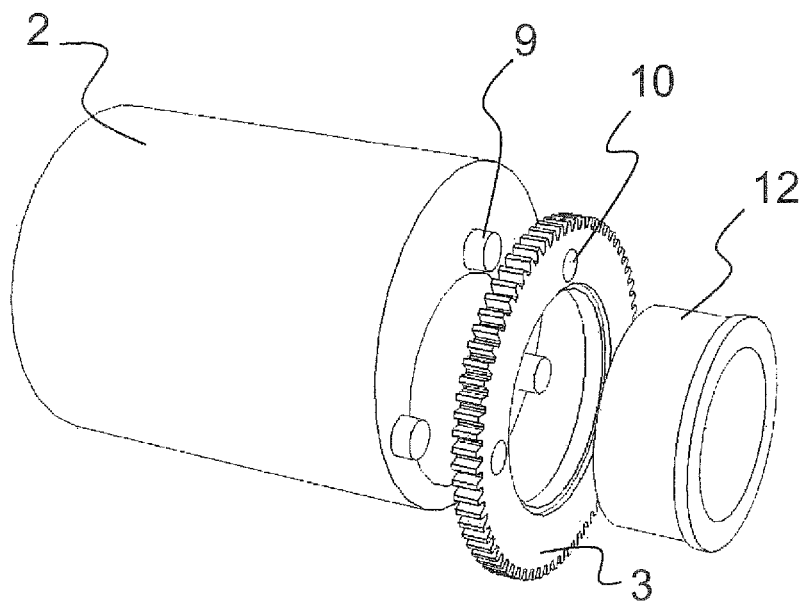
FIG. 3 the schematic diagram of the parts of the bottom bracket gear train, wherein the torque-lock is locked on the eccentric member of a bottom bracket tube by way of a pin connection of a sun wheel.

FIG. 3 shows schematically a torque lock of the sun wheel 3, wherein the sun wheel 3 is secured against rotation relative to the eccentric member 2 by way of a pin connection. The pins 9 are inserted in blind holes of the eccentric member 2 and engage in through-holes 10 of the sun wheel 3. The sun wheel 3 is screwed onto the eccentric member with a fastening screw 12.

Figure 4A:
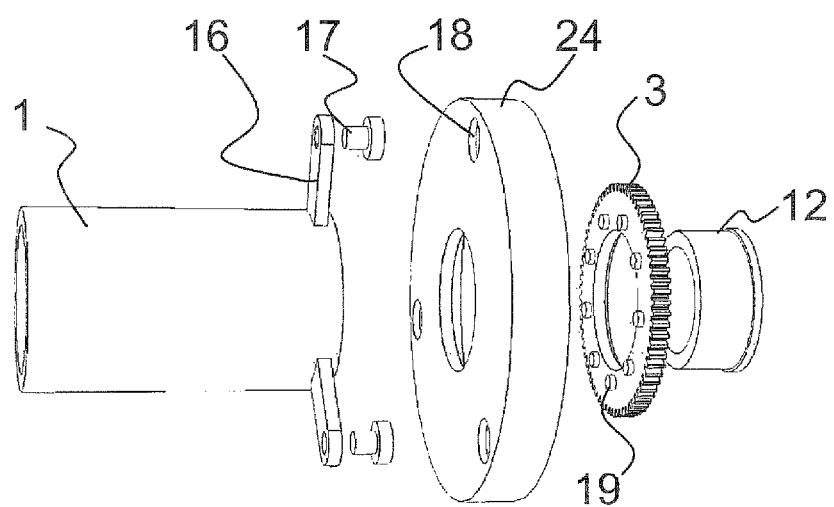
FIGS. 4A and 4B a schematic diagram of the parts of the bottom bracket gear train for torque-locking a sun wheel on a standard bottom bracket tube.
Figure 4B:
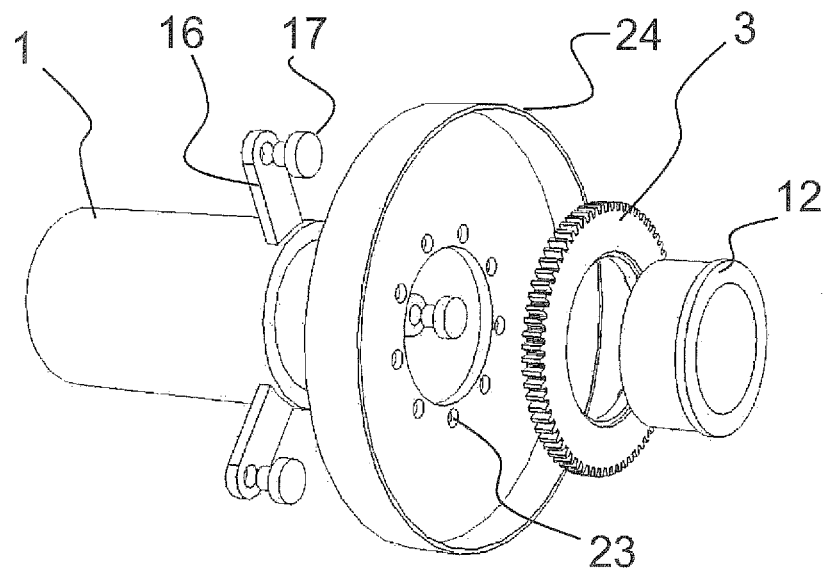

Bottom bracket tubes 1 for standardized mounting of a chain guard (ISCG—International Standard for Chain Guards) have holders 16 which project radially outwardly and are designed for receiving the chain guard. FIGS. 4A and 4B show a torque lock of the bottom bracket gear train according to the invention on such a standard bottom bracket tube 1. A plate 24 which has blind holes 18 on the side facing the bottom bracket tube 1 is arranged between the sun wheel 3 and the bottom bracket tube 1, with corresponding bolts 17 screwed into the holders 16 engaging in the blind holes 18. The plate 24 has through holes 23 located on the front side of the plate 24 facing the sun wheel 3 in which cams 19 formed on the sun wheel 3 engage. The sun wheel 3 is screwed on the bottom bracket tube 1 by way of the fastening screw 12. The sun wheel 3 is therefore locked by way of the pin connection 17, 18 and the cam connection 19, 23 and connected with the bottom bracket tube and secured against rotation therebetween.

Figure 5:
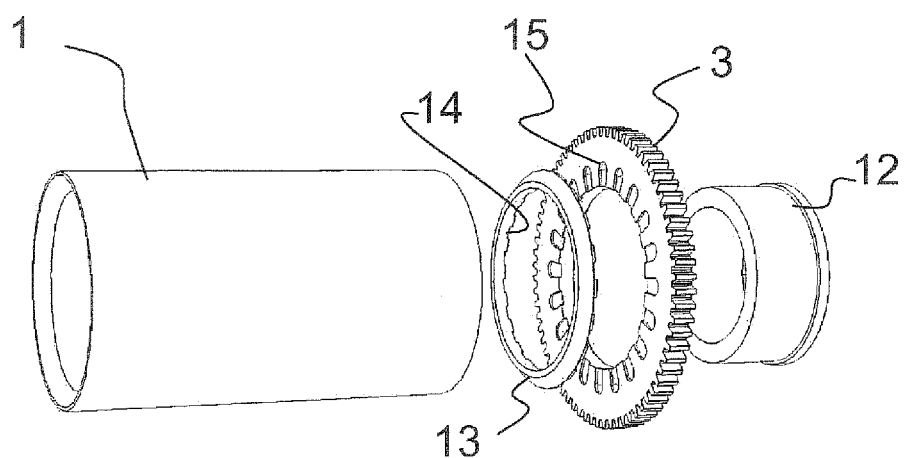
FIG. 5 a schematic diagram of the parts of the bottom bracket gear train for torque-locking a sun wheel by way of a conical ring.

FIG. 5 shows a variant of the torque lock of a sun wheel 3, wherein the sun wheel 3 is secured against rotation by way of a conical ring 13. The conical ring 13 is arranged between the sun wheel 3 and the bottom bracket tube 1 and coaxial with respect to the sun wheel 3. The side of the conical ring facing the bottom bracket tube 1 is shaped so as to fit in a corresponding conical bevel of the bottom bracket tube 1. Protruding cams 14 engage with corresponding recesses 15 of the sun wheel 3 on the side of the conical ring 13 facing the sun wheel 3. The material of the conical ring 13 is selected so as to have the largest possible friction coefficient with respect to the bottom bracket tube 1, for example a steel cone for an aluminum bottom bracket tube or an aluminum cone for a steel bottom bracket tube. The sun wheel 3 is screwed on the bottom bracket 1 with the fastening screw 12 and is secured against rotation, on one hand, by the cams 14 of the conical ring 13 which engage in the recesses 15 of the sun wheel 3 and, on the other hand, by the clamping connection of the conical ring 13 with the bottom bracket tube 1.

Figure 6:
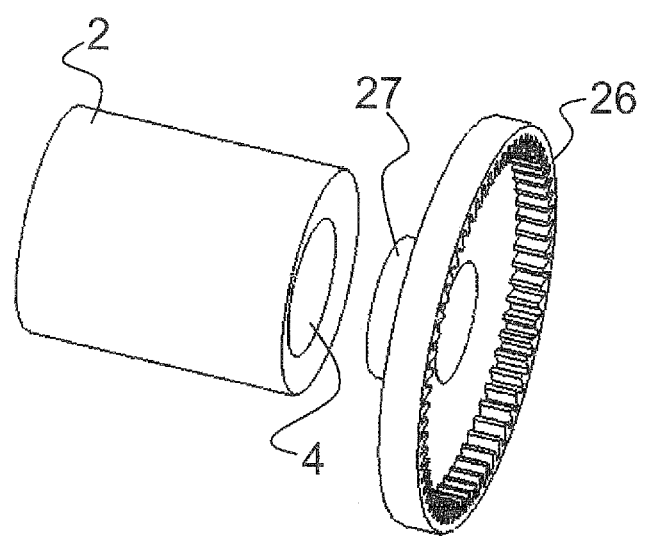
FIG. 6 a schematic diagram of the parts of the bottom bracket gear train for torque-locking an inner-tooth housing which can be screwed into an eccentric member of the bottom bracket tube by way of a flanged-on thread.

The bottom bracket gear train according to the invention can advantageously be inserted in the bottom bracket tube of a bicycle regardless of the form of the frame structure. The invention is not limited to the aforedescribed exemplary embodiments of the torque lock. Likewise, the different embodiments of the torque lock or combinations of the embodiments can not only be used for gear trains with a sun wheel to be locked, but also for other embodiments of the bottom bracket gear train, for example with a hollow wheel to be locked. FIG. 6 shows schematically such an embodiment, wherein the housing 26 with interior teeth corresponds to the hollow wheel of a planetary drive, which can be screwed into the thread 4 of an adapter 2 or the bottom bracket tube 1 by way of a flanged-on thread 27.

The invention claimed is:

1. A shiftable bottom bracket gear train for a bicycle, comprising:
   a bottom bracket tube having an interior thread,
   a gear train housing having a sprocket and a disk arranged in parallel with the sprocket,
   a drive shaft extending through the bottom bracket tube in an axial direction and operatively connected with pedal cranks,
   a shifting axle arranged in the drive shaft, wherein the shifting axle is connected to a coupling piece and configured for external actuation by a shifting element, and
   a gear wheel having a flanged portion with an exterior thread,
   wherein a torque lock between the gear wheel and the bottom bracket tube is implemented as a screw connection between the exterior thread of the flanged portion of the gear wheel and the interior thread of the bottom bracket tube so as to block the gear wheel from rotating relative to the bottom bracket tube.

2. The shiftable bottom bracket gear train of claim 1, further comprising a conical ring arranged between the gear wheel and the bottom bracket tube coaxially with respect to the gear wheel, wherein the bottom bracket tube has a conical bevel and a side of the conical ring facing the bottom bracket tube is formed so as to fit inside the conical bevel, and wherein an opposite side of the conical ring comprises protruding cams configured to engage in corresponding recesses of the gear wheel, and wherein the gear wheel is secured for rotation on the bottom bracket tube by a fastening screw.

3. The shiftable bottom bracket gear train of claim 2, wherein the conical ring is made of a material having a high friction coefficient relative to a material of the bottom bracket tube.

4. The shiftable bottom bracket gear train of claim 1, further comprising a cover, wherein a side of the gear wheel facing the cover comprises blind holes, and further comprising magnets inserted in the blind holes for holding the cover against the gear wheel.

5. A shiftable bottom bracket gear train for a bicycle, comprising:
   a bottom bracket tube,
   an adapter arranged inside the bottom bracket tube and having an interior thread,
   a gear train housing having a sprocket and a disk arranged in parallel with the sprocket,
   a drive shaft extending through the bottom bracket tube in an axial direction and operatively connected with pedal cranks,
   a shifting axle arranged in the drive shaft, wherein the shifting axle is connected to a coupling piece and configured for external actuation by a shifting element, and
   a gear wheel having a flanged portion with an exterior thread,
   wherein a torque lock between the gear wheel and the bottom bracket tube is implemented as a screw connection between the exterior thread of the flanged portion of the gear wheel and the interior thread of the adapter so as to block the gear wheel from rotating relative to the bottom bracket tube.

6. The shiftable bottom bracket gear train of claim 5, further comprising a conical ring arranged between the gear wheel and the bottom bracket tube coaxially with respect to the gear wheel, wherein the bottom bracket tube has a conical bevel and a side of the conical ring facing the bottom bracket tube is formed so as to fit inside the conical bevel, and wherein an opposite side of the conical ring comprises protruding cams configured to engage in corresponding recesses of the gear wheel, and wherein the gear wheel is secured for rotation on the bottom bracket tube by a fastening screw.

7. The shiftable bottom bracket gear train of claim 6, wherein the conical ring is made of a material having a high friction coefficient relative to a material of the bottom bracket tube.

8. The shiftable bottom bracket gear train of claim 5, further comprising a cover, wherein a side of the gear wheel facing the cover comprises blind holes, and further comprising magnets inserted in the blind holes for holding the cover against the gear wheel.

* * * * *